March 13, 1956
W. N. MATSON
2,737,993
DEFORMABLE LOCKING DEVICE USED WITH
AXIALLY RECESSED ROTATABLE MEMBERS
Filed Aug. 18, 1953
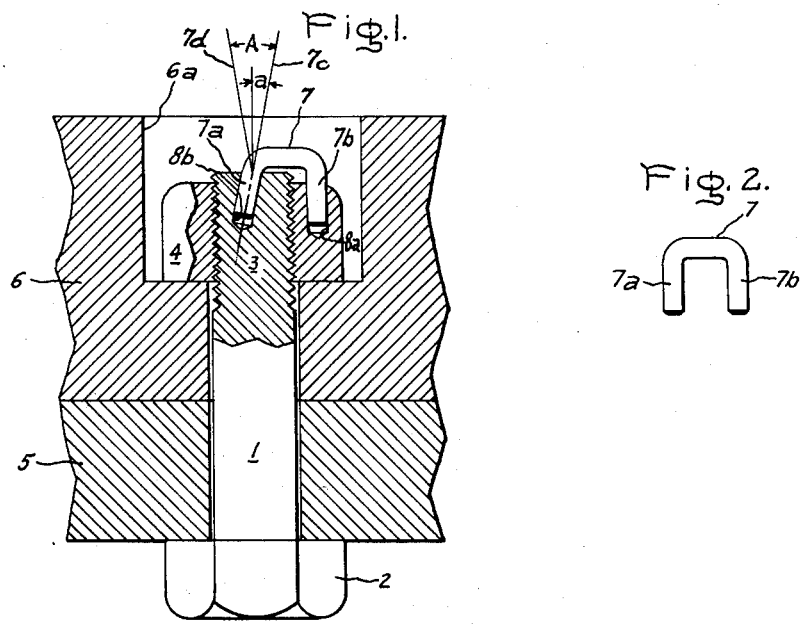
Inventor:
William N. Matson,
by *Kiess*
His Attorney.

United States Patent Office 2,737,993
Patented Mar. 13, 1956

2,737,993

DEFORMABLE LOCKING DEVICE USED WITH AXIALLY RECESSED ROTATABLE MEMBERS

William N. Matson, Fitchburg, Mass., assignor to General Electric Company, a corporation of New York Application August 18, 1953, Serial No. 374,914

2 Claims. (Cl. 151—8)

This invention relates to thread-locking devices, particularly to a simple device for locking nuts on comparatively large threaded members, on the order of ½" diameter or larger.

Although countless nut-locking devices have been devised, most of them have the serious disadvantage of requiring an interruption to the thread in the nut, or the bolt, or both. This makes the locking arrangement more expensive to fabricate and raises the possibility of difficulty in assembling or disassembling the device because of "burrs" resulting from interrupting the thread or in assembling or disassembling the locking device which traverses the thread.

The object of the present invention is to provide an improved nut-locking device which requires no modification to the thread, which permits assembly of the nut to the bolt at any circumferential orientation relative thereto, which provides a substantially constant resistance to removal of the nut for all circumferential orientations thereof, which permits adjusting the nut even after the locking device is assembled, which can be assembled to the nut in a deep counterbore preventing access to the side of the nut, which results in substantially no projections from the bolt for catching on clothing or injuring personnel by accidental brushing against the device, which permits ready disassembly of the nut and re-use of the locking device, which will withstand shock and vibration, and which necessitates only very simple and comparatively inexpensive modifications of the bolt and nut.

Other objects and advantages will become apparent from the following description taken in connection with the accompanying drawings, in which Fig. 1 shows a sectional view of a bolt having a nut locked by a device in accordance with the invention, Fig. 2 illustrates the locking member, and Fig. 3 shows the locking device applied to hold the bolt stationary as well as for locking the nut to the bolt.

Generally stated, the invention is practiced by drilling a hole in the nut member parallel to the axis of the bolt, providing a non-parallel hole centrally located in the bolt, and then driving a comparativey stiff staple member axially into these holes, whereby the deformed staple resists rotation of the nut relative to the bolt.

Referring now more particularly to the drawings, Fig. 1 shows the invention as applied to a bolt member 1 having a hexagonal head 2 and a threaded end portion 3 on which is assembled a nut 4. The bolt 1 is shown as securing a plate member 5 to a thick walled member 6 having a comparatively deep counter-bore 6a in which the nut 4 is disposed.

The locking device to which the present invention particularly relates, comprises a parallel-legged staple member 7 shown in Fig. 2. This may be conveniently formed of round wire stock which is comparatively stiff so as to resist bending deformation of the parallel legs 7a, 7b.

The only modification required for the nut and bolt comprises two drilled holes, identified 8a and 8b. As will be apparent in Fig. 1, the hole 8a is merely drilled into the nut parallel to the axis thereof. On the other hand, the hole 8b in the end of the bolt starts at the axis of the bolt but progresses into the end thereof at an angle identified a with the axis.

To assemble the locking device, nut 4 is first assembled on bolt 1 and tightened to the extent desired. With the construction of Figure 1, where the deep counterbore 6a prevents application of an ordinary wrench to the nut 4, the nut could of course be tightened by a suitable socket wrench or by turning the bolt head 2. The staple 7 is then applied to the holes 8a, 8b and driven forcibly into place, during which process the leg 7a of the staple is deformed through the angle a. The design of the staple, and the material of which it is fabricated, are so selected that the deformation of the leg 7a through the angle a will result in a permanent set.

It will be obvious that the inclination of the staple leg 7a, taken in combination with the fact that the staple assumes a permanent set when driven into place, will prevent the staple from accidentally falling out of the assembled position. Actually, it takes a substantial force to remove the staple, since the leg 7a has to be deformed back to its original parallel condition in the process. Thus, there is no danger of the locking device shaking loose when subjected to vibration in normal operation.

The locking effect of the staple 7 is derived from the fact that any tendency of the nut to rotate relative to the bolt is accompanied by further deformation of the leg 7a relative to the axis of the bolt. More specifically, if the nut 4 should be forced to rotate 180 degrees relative to the bolt, the leg 7a would be required to deflect from the axis identified 7c in Figure 1 to the new axis identified 7d. This total deflection is indicated by the reference letter A. It will also be observed that during such 180 degree rotation, the leg 7a would be continuously deformed. Thus, a substantial force is created tending to resist rotation of the nut for all circumferential orientations of the nut relative to the bolt. The diameter of the stock from which the staple is fabricated is of course so related to the diameter of the holes 8a, 8b that there is a substantial amount of friction between the staple and the walls of the holes. Thus the friction force between the legs of the staple and the walls of the holes in the nut and bolt respectively provide an additional force tending to resist rotation.

It will be apparent that the locking effect is provided by a substantial friction force between the legs of the locking staple and the recesses in the nut and bolt, and also by the resistance to deformation of the staple leg 7a.

It will of course be obvious to those familiar with this art that many modifications of the precise structure used might be made. For instance, as shown in Figure 3, the recess in the nut may be formed by drilling a hole 8c and then milling a transverse groove 8d in the side of the nut. The construction of the bolt and the design of the staple are identical to that shown in Figure 1. With the arrangement of Figure 3, the staple leg 7b may also suffer some deformation by engagement with the curved wall of milled slot 8d when it is driven into place.

Figure 3 also illustrates how the invention may be employed to prevent rotation of the bolt relative to the member in which the bolt is assembled. The staple 9 is driven into an axial hole 10 in the member 5 and into an inclined hole 11 in the bolt head 2. The action of staple 9 is precisely as described in connection with the staple 7 of Fig. 2. It will be apparent how the staple 9 tends to resist rotation of the bolt head 2 relative to member 5.

A still further modification would be to drill the hole 10 (Fig. 3) at an acute angle different from the angle a with the axis of the bolt so that both legs 9a, 9b would be deformed when staple 9 is driven into the position shown in Fig. 3. Such an arrangement would prevent the bolt 1 from falling out of its assembled relation to members 5, 6a during assembly of the nut 4. Thus, the device might be useful in connection with "blind" assemblies where the bolt 1 had to be assembled to the members 5, 6a and then the nut 4 assembled later at a time when the head of bolt 2 was inaccessible.

Many other modification will occur to those skilled in the art.

It will be appreciated that there is no damage to the thread of either nut or bolt in the use of this locking device. Thus, the staple may be removed and the bolt and nut re-used repeatedly. The staple itself may become damaged in the assembly or disassembly process, but may be re-used to a limited extent. It will be apparent that the simple modification required to the structure of the bolt and nut will increase the cost thereof only slightly, and that any standard nuts and bolts can be readily modified to employ the locking device of the invention.

The nut may be adjusted continuously throughout 360 degrees, rather than being limited to predetermined increments of circumferential orientation relative to the nut. It is also possible to adjust the nut after application of the locking device, simply by applying enough force to effect appropriate deformation of the locking staple. Because of the permanent set acquired by the staple, it will then be operative to hold the nut in the new adjusted position.

It is also important to note that if, for some reason, the nut 4 should become loosened a partial turn, the locking device will continue to exert a force tending to resist further rotation. In other words, the locking staple will continue to perform its function during a substantial amount of rotation of the nut relative to the bolt, until finally one end of the staple becomes disengaged from one of the cooperating threaded members.

A further advantage is that the locking device results in no substantial projection from the bolt, to catch on clothing or injure persons who may accidentally brush against it.

It is believed that the improved locking device in accordance with my invention will withstand shock and vibration better than previously known nut-locking devices.

The locking device is readily disassembled either by pulling the staple out with a pliers, or by first cutting it in half with a chisel after which the two portions can be more easily removed from the holes in the nut and bolt or by simply turning the nut with enough force to deform the staple until it finally is disengaged from one member.

Because of the extremely simple modification required in the structure of the nut and bolt, this locking device requires only a very small increase in cost over that of a conventional bolt and nut.

It is of course intended to cover by the appended claims, all such modifications as fall within the true spirit and scope of the invention.

What I claim as new and desire to secure by Letters Patent of the United States is:

1. A locking arrangement for a cylindrical member adapted to be rotatably disposed in a hole in a cooperating member, with one end portion of the cylindrical member substantially flush with an adjacent surface of the cooperating member, the locking structure comprising a portion of said cooperating member defining a recess parallel to the axis of said cylindrical member and spaced radially therefrom, the cylindrical member defining a non-parallel hole starting at the axis of the end surface of the cylindrical member and proceeding into the end portion thereof at an acute angle to the axis thereof, and a U-shaped staple member having parallel leg members adapted to be disposed at the entrance to said non-parallel hole and recess and then forcibly driven thereinto, during which process one leg is deformed corresponding to the angle defined by the hole in the cylindrical member relative to the axis thereof, said deformation serving to retain the staple member in assembled position, whereby rotation of the cylindrical member relative to the cooperating member is resisted by the further deformation of the non-parallel leg of the staple which accompanies any relative rotation between the members.

2. A nut-locking arrangement comprising a nut member having a portion defining a recess extending substantially parallel to the axis of the cooperating bolt member and spaced radially therefrom, the bolt member defining a non-parallel hole beginning at the axis of the end surface of the bolt and proceeding into the end portion thereof at an acute angle to the axis of the bolt, and a U-shaped member having parallel legs adapted to be disposed at the entrance of said non-parallel hole and recess and then forcibly driven thereinto, during which process one leg is deformed corresponding to the angle defined by the hole relative to the axis of the bolt, said deformation serving to resist rotation of the nut relative to the bolt by reason of the further deformation of the non-parallel leg of the staple which accompanies any such relative rotation.

References Cited in the file of this patent

UNITED STATES PATENTS

| | | |
|---|---|---|
| 947,616 | Kyle | Jan. 25, 1910 |
| 1,296,003 | Newton | Mar. 4, 1919 |
| 1,835,262 | Bergman | Dec. 8, 1931 |